United States Patent [19]

Mallya et al.

[11] Patent Number: 4,810,763

[45] Date of Patent: Mar. 7, 1989

[54] SUSPENSION POLYMERIZATION IN AN ORGANIC MEDIUM

[75] Inventors: Prakash Mallya, Pasadena; Yehuda Ozari, Arcadia, both of Calif.

[73] Assignee: Avery International Corporation, Pasadena, Calif.

[21] Appl. No.: 138,509

[22] Filed: Dec. 23, 1987

[51] Int. Cl.$^4$ ............................................. C08F 2/00
[52] U.S. Cl. .................... 526/203; 526/209; 526/210; 526/318.4; 526/931
[58] Field of Search ............ 526/210, 931, 209, 318.4, 526/203

[56] References Cited

U.S. PATENT DOCUMENTS

| | | | |
|---|---|---|---|
| 3,691,140 | 9/1972 | Silver | 524/829 |
| 3,862,075 | 1/1975 | Sekmakas | 526/210 |
| 3,943,190 | 3/1976 | Abe et al. | 525/305 |
| 4,074,004 | 2/1978 | Bateson et al. | 526/209 |
| 4,143,020 | 3/1979 | Emmons et al. | 526/287 |
| 4,164,365 | 8/1979 | Saxe | 350/362 |
| 4,166,152 | 8/1979 | Baker et al. | 524/745 |
| 4,354,907 | 10/1982 | Machi et al. | 526/210 |
| 4,415,615 | 11/1983 | Esmay et al. | 428/349 |
| 4,435,524 | 3/1984 | Dinbergs | 526/209 |
| 4,495,318 | 1/1985 | Howard | 524/375 |
| 4,501,826 | 2/1985 | Meitzner et al. | 521/52 |
| 4,607,057 | 8/1986 | Bonnans et al. | 526/209 |
| 4,699,857 | 10/1987 | Giovannoni et al. | 429/204 |
| 4,710,525 | 12/1987 | Kraemer et al. | 523/201 |

FOREIGN PATENT DOCUMENTS

| | | | |
|---|---|---|---|
| 4512860 | 12/1965 | Japan | 526/209 |
| 54-56690 | 5/1979 | Japan | 526/209 |
| 1136751 | 12/1968 | United Kingdom | 526/209 |

*Primary Examiner*—Joseph L. Schofer
*Assistant Examiner*—N. Sarafim
*Attorney, Agent, or Firm*—Christie, Parker & Hale

[57] ABSTRACT

Inherently tacky infusible pressure-sensitive adhesive microspheres are prepared by polymerizing at least one monomer which when polymerized will form a pressure-sensitive adhesive having a glass transition temperature less than abotu $-20°$ C. in an organic medium in which the monomer is substantially insoluble and in the presence of a surfactant and a suspension stabilizer which are soluble in the organic medium and substantially insoluble in the monomer under conditions of shear sufficient to form suspended particles of a size less than 200 microns. A monomer soluble initiator is preferably employed. The preferred media are ethylene glycol and glycerol and the preferred monomers are 2-ethyl hexyl acrylate and methacrylic acid.

39 Claims, No Drawings

SUSPENSION POLYMERIZATION IN AN ORGANIC MEDIUM

BACKGROUND OF THE INVENTION

The present invention relates to normally tacky pressure-sensitive adhesive microspheres useful in the production of removable and repositionable note paper tape and label products.

The mid-1970's saw the introduction of removable and repositionable note papers which have found broad acceptance in the marketplace. The adhesives utilized in some of the products were infusible, inherently tacky, elastomeric microspheres prepared by an aqueous suspension polymerization process. Aqueous suspension polymerization processes are described, for instance, in U.S. Pat. Nos. 3,691,140 to Silver, 4,166,152 to Baker et al., 4,495,318 to Howard, and 4,598,212 also to Howard.

The problem with adhesive microspheres produced by an aqueous suspension polymerization process is that there is a need to recover the microspheres from the medium in which they are prepared, then redisperse them in a organic solvent for application to paper or another substrate. This procedure is required in the instance of paper because the presence of water will cause paper to which the adhesive microspheres are applied to curl. Aqueous suspension polymerization is, therefore, a costly means of note paper manufacture.

It has also been stated in connection with the production of removable and repositionable products that if the adhesive force provided is too small, the product will literally fall off the surface to which it is applied, and if too great, will tear or delaminate paper surfaces at normal removal rates. Application of the adhesive coatings so as to achieve peel values within a desired range requires therefore considerable know-how.

A considerable reduction in manufacturing costs and better control over the product performance can result if the adhesive is prepared where the medium can be effectively used to control particle size and therefore adhesion and also where there is eliminated the need to recover the adhesive from the medium in which it is prepared by a tedious and expensive step such as coagulation. This is the object of the instant invention.

SUMMARY OF THE INVENTION

According to the present invention there is provided a suspension polymerization process which utilizes an organic medium in which infusible adhesive microspheres are prepared with shear being employed to control microsphere diameter.

Preparation of the adhesive microspheres in an organic medium enables production of a microsphere adhesive product which can be directly applied from the medium to a substrate, such as paper without curl, or the medium substantially eliminated to enable adhesive transfer to a more volatile organic medium for application to a paper substrate again without curl, and enable production of the useful removable and repositionable product at a substantially reduced cost.

The process of the instant invention involves the polymerization of one or more monomers to form an inherently tacky, infusible, pressure-sensitive adhesive microspheres having a glass transition temperature of less than about −20 C. in an organic medium in which at least one of the principal monomers is substantially insoluble. Polymerization preferably occurs in the presence of an initiator which is soluble in the monomers and substantially insoluble in the medium and in the presence of a surfactant and one or more suspension stabilizers either of which may be nonanionic, anionic, cationic or amphoteric in nature, and both of which are soluble in the organic medium and substantially insoluble in the monomers. The presently preferred medium is ethylene glycol or glycerol and the principal or bulk monomer is preferably at least one alkyl acrylate ester which is insoluble in the organic medium, preferably 2-ethyl hexyl acrylate which is either homopolymerized or preferably copolymerized with a minor amount of an unsaturated carboxylic acid preferably acrylic and/or methacrylic acid. The monomers are selected and/or proportioned to produce an inherently tacky, pressure-sensitive adhesive microspheres having a glass transition temperature less than about −20 C. Polymerization preferably occurs under autogenous conditions in the presence of from 0.15 to about 0.5 percent by weight of the monomers of a monomer-soluble initiator, preferably benzoyl peroxide. It is presently preferred that the suspension stabilizer be an anionic and/or a nonionic suspension stabilizer, and the surfactant an anionic surfactant. Polymerization occurs with agitation at a shear rate sufficient to form particles having a particle size smaller than about 200 microns, preferably smaller than about 90 microns.

The formed adhesive particles may be applied to a substrate directly from the medium in which they are prepared. Because ethylene glycol and glycerol have low vapor pressures, however, it is expedient to employ a more volatile organic medium, as the carrier from which the adhesive particles are applied to a substrate. Uniquely, it is unnecessary to recover the adhesive particles from the organic medium in which they are prepared. Ideally, since they are insoluble in the medium, the particles can be allowed to separate from the medium, the medium drained off and replaced by the more volatile medium. If it is desired to minimize the amount of polymerization medium present in the volatile medium, the mixture of adhesive polymer particles and polymerization medium can be centrifuged to achieve an even greater separation of the medium from the adhesive polymer particles. The organic medium is then drained off and a concentrate of adhesive polymer particles dispersed in the more volatile organic carrier for application to a substrate, such as paper, for the production of removable labels, note paper products and tapes, or to a self-supporting non-paper substrate such as mylar and aluminum foil for production of removable products such as tapes and labels. If desired, the dispersion of adhesive polymer particles in the volatile organic medium can be subjected to a second centrifuging to completely eliminate the medium in which the adhesive polymer particles were prepared.

DETAILED DESCRIPTION

According to the present invention, there is provided a suspension polymerization process for the production of inherently tacky, infusible, pressure-sensitive adhesive microsphere polymers suitable for the production of removable and repositionable products such as labels, note paper, tapes and the like without the need for recovery of the polymers from the medium in which they were prepared.

The tacky microspheres are prepared in an organic medium in which at least the principal or bulk of the monomers are substantially insoluble under conditions of shear in the presence of a suitable suspension stabilizer and surfactant.

The organic medium which is useful in accordance with the present invention includes polyols such as diols, triols and other media in which the principal monomer or monomers to be polymerized are insoluble. The presently preferred medium is ethylene glycol and/or glycerol.

The principal monomers which can be homopolymerized or copolymerized are those which are insoluble in the organic medium and constitute the bulk of the monomers present in the suspension. They include alkyl acrylate esters such as isooctyl acrylate, 2-ethyl hexyl acrylate, butyl acrylate, sec-butyl acrylate, methyl butyl acrylate, 4-methyl 2-pentyl acrylate and the like. Comonomers which can be used are unsaturated mono and dicarboxylic acids such as methacrylic acid, acrylic acid, fumaric acid and the like. Other comonomers include dibutyl fumarate and the like, methacrylates such as methyl methacrylate, isodecyl methacrylate and the like, styrene, vinyl acetate and the like. All that is required is that the principal monomers be substantially insoluble in the medium and be homopolymerizable or copolymerizable in suspension droplet form to form an infusible product which is an inherently tacky pressure-sensitive adhesive having a glass-transition temperature of less than about −20 C. It is presently preferred to employ as monomers 2-ethyl hexyl acrylate and methacrylic acid in which the methacrylic acid content is from 0 to about 5 percent by weight of the monomers. Methacrylic acid is particularly preferred when the medium is ethylene glycol since it is relatively more soluble in 2-ethyl hexyl acrylate compared to the other acids, helps speed up the reaction, and a substantial portion copolymerizes with 2-ethyl hexyl acrylate.

Polymerization preferably occurs in the presence of a monomer soluble initiator such as benzoyl peroxide, chloro methyl benzoyl peroxide, lauroyl peroxide, decanoyl peroxide and the like. The concentration of the initiator is from about 0.15 to about 0.5 percent by weight of the monomers preferably about 0.25 percent by weight of the monomers. Benzoyl peroxide is presently preferred. Autogenous reaction conditions are required for peroxide initiators.

Actinic radiation and electron beam radiation may also be used to initiate the polymerization process.

A suspension stabilizer is required to prevent coalescence of the polymer particles formed during polymerization. A suspension stabilizer may be an anionic suspension stabilizer such as polyacrylic acid, polymethacrylic acid, copolymers of acrylic or methacrylic acids with acrylamide, vinyl pyrrolidone or dimethyl amino ethyl methacrylate and the like, and nonionic suspension stabilizer such as polyvinyl pyrrolidone, partially hydrolyzed polyvinyl acetate, and cationic stabilizers such as quaternized polydimethyl aminoethyl methacrylate and the like, and amphoteric stabilizers such as quaternized copolymers of acrylic acid and dimethylaminoethyl methacrylate and the like, as well as mixtures thereof. The suspension stabilizer must be soluble in the organic medium but substantially insoluble in the monomers. Concentration of suspension stabilizer typically employed is from about 3 to about 15 percent by weight of the monomers preferably from about 7 to 8 percent by weight of the monomer.

A surfactant is required in addition to the stabilizer for optimum stability in a concentration which may or may not be above its critical micelle concentration. Typical concentrations range from about 0.25 to about 3 percent by weight preferably about 1 percent by weight of the monomers when the medium is ethylene glycol. Anionic surfactants are preferred for anionic and nonionic stabilizers and cationic surfactants for cationic suspension stabilizers.

Typical anionic surfactants that can be used are sulfosuccinates and alkyl aryl polyether sulfonates. Sulfosuccinates include sodium dioctyl sulfosuccinate (Aerosol OT, manufactured by American Cyanamid) and sodium dihexyl sulfosuccinate (Aerosol MA, manufactured by American Cyanamid), sodium alkyl aryl polyether sulfonates (Triton X-200, manufactured by Rohm and Haas) and sodium alkyl benzene sulfonate such as sodium dodecyl benzene sulfonate (Siponate DS-10, manufactured by Alcolac). Nonionic surfactants that can be used are alkyl arylpolyether alcohols (Triton N-111, manufactured by Rohm & Haas) and the like, and these are preferably used in combination with anionic surfactants. Cationic surfactants of the type cetyl trimethyl ammonium bromide can be used instead of anionic surfactants in combination with cationic stabilizers.

pH will range from about 4 to about 7.5 for anionic stabilizers or combinations with nonionics and a pH range of 4 to 5 is preferred for nonionic suspension stabilizers.

Some degree of internal polymer cross-linking is required for cohesive strength and to achieve infusibility. One way to achieve this is by hydrogen abstraction using a peroxide initiator. Another way is to employ a multifunctional additive such as multifunctional acrylate, trialyl cyanurate and the like during polymerization to allow cross-linking reactions to occur to control gel content. As the gel content is increased, the modulus of the polymer increases as well. A low modulus is desired to get quick wetting and bond formation on surfaces on which the label is applied. Hence, an optimum balance between gel content and modulus is necessary to get good performance characteristics. Cationic and/or amphoteric comonomers can be used to change the specific adhesion characteristics to certain substrates. Amphoteric monomers include betaines such as 1-(3-sulphopropyl)-2-vinyl pyridinium betaine and the like.

Water need not be present but can be tolerated so long as the water content does not cause curl upon application of the product to a paper substrate. Low levels are desirable.

Shear, as induced by agitation, is required and is used effectively to control particle size. It is presently preferred that sufficient shear be induced to provide a particle size smaller than about 200 microns, preferably smaller than about 90 microns. When the level of shear is too high, there is tendency for the formed particles to be so fine that on application to a substrate at moderate coat weights it will perform like a continuous film. Such a film would show low adhesion to rough surfaces which is not desirable. If shear is too low, particles of too great a size will be formed and tend to be too aggressive due to the high peel force per point of contact and increse the probability, for products removable from paper, of inducing fiber pick or paper tear. Preferably shear rates sufficient to provide particles smaller than about 200 microns should be used. These particles when applied to a substrate will give a discontinuous pattern having peel values such as indicated in Table I below.

Salts such as sodium chloride and lithium chloride, which are soluble in the continuous organic phase, can be effectively used to reduce solubility of monomers in the medium, to control viscosity of the medium and in combination with shear also control particle size. Salts are typically present in levels 0.5 to 10% by weight of the monomers.

Gel content, as determined by extraction with tetrahydrofuran, can range from 60 to 80 percent by weight of the polymer preferably about 65 to about 75 percent.

Polymerization in the organic medium eliminates the need to recover the microspheres from the medium particularly when the microspheres are applied to a paper substrate. It is because the organic medium will not cause curl of a paper substrate. When ethylene glycol or glycerol is the medium, their boiling points are too high for rapid evaporation. Accordingly, it is desirable for the production of removable and repositionable products having a paper substrate to transfer the microspheres to a more volatile medium such as heptane for coating onto paper. Uniquely, there is no need to recover the particles from the medium in which they are formed. Instead, gravity separation or centrifugation can be used to remove the bulk of the medium in which the particles are prepared and the particles and residue of the medium simply incorporated into a more volatile organic medium. There is no need to recover the stabilizer or emulsifier and the amount of volatile medium added is sufficient to insure that upon evaporation a discontinuous coat will result on the substrate. Further centrifuging of the microspheres dispersed in the volatile organic medium will substantially eliminate the ethylene glycol or glycerol, thus facilitating the drying at low temperatures. A discontinuous coating can be achieved in part by swelling of the polymer particles in the medium in which they are prepared and/or dispersed which insures a separation of particles from each other upon evaporation of the medium and shrinkage of the particles. In any event, particles will remain discrete and will not fuse even at higher solids concentrations due to the fact that each particle is internally cross-linked and is incapable of continuous film formation.

To achieve a removable and repositionable product, it is preferably desirable to have a solids content in the medium in which the particles are dispersed, which is inversely proportional to particle size so as to limit the area of the particles available for contact with a surface to which the net product is applied. Larger particles show a higher tendency to transfer onto substrates after substantial dwell times compared to smaller particles due to the fact that contact area and specific adhesion per particle is higher.

The adhesive particles may be applied directly to paper and other substrates. Priming may be desirably used to improve anchorage to the paper and minimize transfer of microspheres to substrates. For microspheres prepared from a copolymer of 2-ethyl hexyl acrylate and methacrylic acid, a particularly useful primer is zinc oxide in an acrylic base polymer. This is coated on the paper and dried before coating the dispersion of microspheres. The particles will adhere better to such a primed surface due to the interaction between the acid groups present in the polymer and $Zn^{+2}$ present in the primer. The reduction in transfer of the microspheres coated on both unprimed and primed paper onto a glass mirror and polished stainless steel plate is shown in Table II below.

Products produced in accordance with the present invention generally comprise discontinuous coat of adhesive microspheres on at least a portion of at least one side of the carrier material and present in an amount to provide, in the zone bounded or defined by the adhesive, from about 10% to about 30%, preferably from about 15% to about 25%, of the adhesive present in the pattern, available for contact with a smooth substrate, such as stainless steel or glass, relative to the amount of adhesive which would have been present if the adhesive were applied as a continuous film. To achieve this level for effective contact, from about 30% to about 75% of the zone which would have been occupied by a continuous film, is covered by pressure-sensitive microspheres. The segments have an average height of at least from about 15 microns, preferably at least about 20 microns to account for the roughness of the face material and the surface to which the product is to be applied.

The following examples are illustrative but no wise limiting of the instant invention.

EXAMPLE 1

One gram of lithium chloride was dissolved in 156 grams of ethylene glycol (over 99% pure) contained in a reactor having a diameter of 4.25 inches and equipped with a stirrer having two pitched turbine blades, one at the bottom being 3.5 inches in diameter and the other 3 inches in diameter placed 0.5 inch above the first blade which was 0.75 inch from the bottom of the reactor. To this mixture there was added 4.14 grams of solid polyacrylic acid provided by Monomer Polymer Labs and designated as Product No. 8878. The polyacrylic acid was dissolved with good agitation while a 25 percent solution of sodium hydroxide was added to maintain the pH at 6.5. There were separately mixed 49 grams of 2-ethyl hexyl acrylate, 1 gram of methacrylic acid and 0.125 gram of benzoyl peroxide. This mixture was slowly added to the reactor. The reactor was evacuated and repressurized with nitrogen. There was then added to the reactor 1.79 grams of a 28 percent solution of Triton X-200 in 5 grams of ethylene glycol with agitation (400 rpm). The reactor was heated to 65° C. and maintained at this temperature with agitation (400 rpm) for 4.5 hours from the onset of an exotherm and then allowed to cool. There were formed polymeric microspheres having particles less than 90 microns in diameter. The mixture was allowed to settle with the polymer microspheres floating to the top. The gel content of the microspheres as determined by tetrahydrofuran extraction for 48 hours was found to be 70.5%. The bulk of the ethylene glycol was drained off and replaced by heptane to a solids content of about 11% and applied to paper as a coating. The paper did not curl and there was a left a removable and repositionable product free of paper curl. The typical adhesion values of microspheres is shown in Table I.

EXAMPLE 2

Following the procedure of Example 1 there was formed a mixture of 10 grams sodium chloride, 215 grams ethylene glycol, and 72 grams Acrysol HV-1 (a ten percent solution of a polyacrylic acid in water). And to this there was added with agitation a solution of 99 grams of 2-ethyl hexyl acrylate, 1 gram methacrylic acid and 0.25 gram benzoyl peroxide, the reaction mixture was agitated at 400 rpm under nitrogen purge after the addition of the mixture of 2-ethyl hexyl acrylate, methacrylic acid and benzoyl peroxide. There was then added to the reactor 3.57 g of 28% solution of Triton X-200 in 8.0 grams of ethylene glycol. After 4.5 hours of reaction at 65° C., there were formed tacky microsphere particles having a particle size of less than about 90 microns. The gel content of the microspheres as determined by extraction with tetrahydrofuran for 48 hours was found to be 74%. The mixture was allowed settle, the bulk of the ethylene glycol drained off and the residue transferred heptane to a solids content of about 10%. When applied to canary yellow paper, there was formed without curl a repositionable note paper product. The typical adhesion values of these microspheres is shown in Table I.

Table I compares the performance of the polymers of Example 1 to Example 2 as a function of solids content in heptane. The product of Example 1 has better adhesion to the paper face stock. Table II compares microsphere transfer of the product of Example 2 as a function of primer used.

TABLE 1

| POLY-MER | PA-PER | % SOLIDS (IN HEPTANE) | COAT WEIGHT g/sq. m | TLMI PEEL N/M | COMMENT |
|---|---|---|---|---|---|
| EX. 1 | UP | 8 | 7.3 | 57.6 | VLPS,NT |
| EX. 1 | UP | 11 | 9.5 | 63.0 | VLPS,NT |
| EX. 1 | UP | 11 | 15.4 | 85.7 | VLPS,NT |
| EX. 1 | UP | 11 | 18.9 | 92.0 | VLPS,NT |
| EX. 2 | UP | 10 | 9.5 | 85.1 | T |
| EX. 2 | UP | 10 | 13.4 | 135.1 | T |

UP = Unprimed paper
VLPS = Very light panel stain
NT = No transfer of microspheres onto SS panel
T = Transfer of microspheres onto SS panel
SS = Stainless steel
TLMI PEEL = 4.5 lb roll, 20' dwell, 300"/min.peel rate, SS
Example 1 particles were <90 micron diameter as polymerized
Example 2 particles were >90 micron diameter as polymerized

TABLE II

| POLY-MER | PAPER | % TRANSFER TO MIRROR | | % TRANSFER TO SS | |
|---|---|---|---|---|---|
| | | 24 HR. | 10 DAYS | 24 HR. | 10 DAYS |
| EX. 2 | UP | 5-7 | 8-9 | 3-6 | 7-8 |
| EX. 2 | P-1 | 0.6-1.8 | 1.5-3.0 | 0.6-1.8 | 0.9-1.5 |
| EX. 2 | P-2 | 0.03 | 0.12 | 0.05 | 0.05 |

UP = Unprimed paper
P-1 = Primed paper (Acryloid C-10LV resin only. No ZnO in primer)
P-2 = Primed paper (80% ZnO in Acryloid C-10LV resin)
SS = Stainless steel
10% dispersion of microspheres in heptane coated onto paper. Particle population count per square cm. was determined under low magnification. Slips of the coated paper were applied on polished stainless steel plate and on glass mirror. The transfer of the particles on the two substrates was determined as percentage of the original population, after 24 Hrs. and 10 days

EXAMPLE 3

The procedure of Example 1 was repeated except that agitation was increased to 620 rpm. The formed microspheres had a particle size less than about 70 microns.

EXAMPLE 4

The procedure of Example 1 was repeated except the agitation was reduced to 150 rpm. Microsphere size was less than about 180 microns.

EXAMPLE 5

Following the procedure of Example 1, 4.14 grams of polyacrylic acid was dissolved in 195 grams of glycerol contained in a reactor. A 25 percent solution of sodium hydroxide was added to maintain a pH at 6.7. There was separately mixed 1 gram of lithium chloride and 2 grams of deionized water in 9 grams of glycerol, and 49 grams of 2-ethyl hexyl acrylate, 2 grams of methacrylic acid and 0.125 gram of benzoyl peroxide. They were slowly added to the reactor. The reactor was evacuated and repressurized with nitrogen. There was then added to the reactor 1.79 grams of a 28% solution of Triton X-200 in 5 grams of glycerol. The reactor was heated to 65° C. and maintained this temperatue with agitation (400 rpm) for 4.5 hours from the onset of an exotherm and then allowed to cool. There were formed polymeric microspheres having a particle size less than 50 microns.

What is claimed is:

1. A process for the production of infusible, inherently tacky pressure-sensitive adhesive microspheres which comprises polymerizing at least one monomer which when polymerized will form a pressure-sensitive adhesive having a glass transition temperature less than about −20° C. in an organic medium in which the monomer is substantially insoluble in the presence of a surfactant which is soluble in the organic medium and substantially insoluble in the monomer and at least one suspension stabilizer, which is soluble in the organic medium under conditions of shear sufficient to form suspended particles having a particle size less than about 200 microns.

2. A process as claimed in claim 1 in which the organic medium is selected from the group consisting of ethylene glycol and glycerol.

3. A process as claimed in claim 1 in which the organic medium comprises from about 70 to 100% by weight ethylene glycol, and from about 30 to 0% by weight water.

4. A process as claimed in claim 1 in which the monomer comprises an alkyl acrylate ester.

5. A process as claimed in claim 1 in which the monomer comprises an alkyl acrylate ester and at least one unsaturated carboxylic acid.

6. A process as claimed in claim 2 in which the monomer comprises an alkyl acrylate and at least one unsaturated carboxylic acid.

7. A process as claimed in claim 3 in which the monomer is an admixture of at least one alkyl acrylate ester and at least one unsaturated carboxylic acid.

8. A process as claimed in claim 4 in which the alkyl acrylate is 2-ethyl hexyl acrylate.

9. A process as claimed in claim 1 in which the monomers are a mixture of 2-ethyl hexyl acrylate and methacrylic acid.

10. A process as claimed in claim 1 in which the suspension stabilizer comprises a polyacrylic acid.

11. A process as claimed in claim 1 in which the surfactant is alkyl aryl polyether sulfonate.

12. A process as claimed in claim 10 in which the surfactant is alkyl aryl polyether sulfonate.

13. A process as claimed in claim 4 in which the reaction is carried out at pH from about 4.0 to about 7.5.

14. A process as claimed in claim 1 in which there is present in the medium a salt selected from sodium chloride and lithium chloride at a concentration of about 0.5 to about 10% by weight of the monomers.

15. A process as claimed in claim 1 in combination with the steps of separating the pressure-sensitive adhesive microspheres from a substantial portion of the organic medium in which they are formed and transferring the pressure-sensitive adhesive microspheres to a more volatile organic medium for use as a carrier for application of the pressure-sensitive adhesive microspheres onto a substrate.

16. A process as claimed in claim 15 in which the volatile organic medium is heptane and the substrate is paper.

17. A process for the production of infusible inherently tacky pressure-sensitive adhesive microspheres which comprises polymerizing at least one monomer which when polymerized will form an infusible pressure-sensitive adhesive having a glass transition temperature less than about $-20°$ C. in an organic medium in which the monomer is soluble under autogenous conditions in the presence of an initiator which is soluble in the monomer and substantially insoluble in the organic medium and in the presence of surfactant which is soluble in the organic medium and substantially soluble in the monomer and at least one suspension stabilizer, which is substantially insoluble in the organic medium under conditions of shear sufficient to form suspended particles having a particle size up to about 200 microns.

18. A process as claimed in claim 17 in which the organic medium is selected from the group consisting of ethylene glycol and glycerol.

19. A process as claimed in claim 17 in which the organic medium comprises from base and the weight of the medium, from about 70 to 100% by weight ethylene glycol, and from about 30 to 0% by weight water.

20. A process as claimed in claim 17 in which the monomer comprises an alkyl acrylate ester.

21. A process as claimed in claim 17 in which the monomer comprises an alkyl acrylate ester and at least one unsaturated carboxylic acid.

22. A process as claimed in claim 18 in which the monomer comprises an alkyl acrylate ester and at least one unsaturated carboxylic acid.

23. A process as claimed in claim 19 in which the monomer is an admixture of at least one alkyl acrylate ester and at least one unsaturated carboxylic acid.

24. A process as claimed in claim 23 in which the alkyl acrylate is 2-ethyl hexyl acrylate.

25. A process as claimed in claim 17 in which the monomers are a mixture of 2-ethyl hexyl acrylate and methacrylic acid.

26. A process as claimed in claim 17 in which the monomer soluble initiator is benzoyl peroxide.

27. A process as claimed in claim 24 in which the monomer soluble initiator is benzoyl peroxide.

28. A process as claimed in claim 25 in which the monomer soluble initiator is benzoyl peroxide.

29. A process as claimed in claim 17 in which the suspension stabilizer comprises a polyacrylic acid.

30. A process as claimed in claim 28 in which the suspension stabilizer comprises a polyacrylic acid.

31. A process as claimed in claim 17 in which the reaction is carried out at pH from about 4.0 to about 7.5.

32. A process as claimed in claim 29 in which the reaction is carried out at pH from about 4.0 to about 7.5.

33. A process as claimed in claim 17 in which the surfactant is alkyl aryl polyether sulfonate.

34. A process as claimed in claim 30 in which the surfactant is alkyl aryl polyether sulfonate.

35. A process as claimed in claim 17 in which there is present in the medium a salt selected from sodium chloride and lithium chloride at a concentration of about 0.5 to about 10% by weight of the monomers.

36. A process as claimed in claim 30 in which there is present in the medium a salt selected from sodium chloride and lithium chloride at a concentration of about 0.5 to about 10% by weight of the monomers.

37. A process as claimed in claim 17 in combination with the steps of separating the pressure-sensitive adhesive microspheres from a substantial portion of the organic medium in which they are formed and transferring the pressure-sensitive adhesive microspheres to a more volatile organic medium for use as a carrier for application of the pressure-sensitive adhesive microspheres onto a substrate.

38. A process as claimed in claim 37 in which the volatile organic medium is heptane and the substrate is paper.

* * * * *

UNITED STATES PATENT AND TRADEMARK OFFICE
CERTIFICATE OF CORRECTION

PATENT NO. : 4,810,763

DATED : March 7, 1989

INVENTOR(S) : P. Mallya; Y. Ozari

It is certified that error appears in the above-identified patent and that said Letters Patent is hereby corrected as shown below:

On the Front Page

Abstract, line 5, change "abotu" to -- about --.

Front Page, change "39 claims" to -- 38 claims --

Column 6, lines 43,44,67, change "rpm" to -- RPM -- (all occurrences).
Column 6, line 55, before "left" delete -- a --.

Column 7, line 9, before "settle" insert -- to --.
Column 7, line 48, change "cm." to -- cm --.
Column 7, lines 55,61, change "rpm" to -- RPM -- (both occurrences).

Column 8, line 9, change "temperatue" to -- temperature --.
Column 8, line 10, change "rpm" to -- RPM --.

Signed and Sealed this

Thirteenth Day of February, 1990

Attest:

JEFFREY M. SAMUELS

*Attesting Officer*  *Acting Commissioner of Patents and Trademarks*